Jan. 21, 1964     H. FREDMAN     3,118,151
ONE-PIECE BELT-TYPE BEDDING CARRIER
Filed April 10, 1962
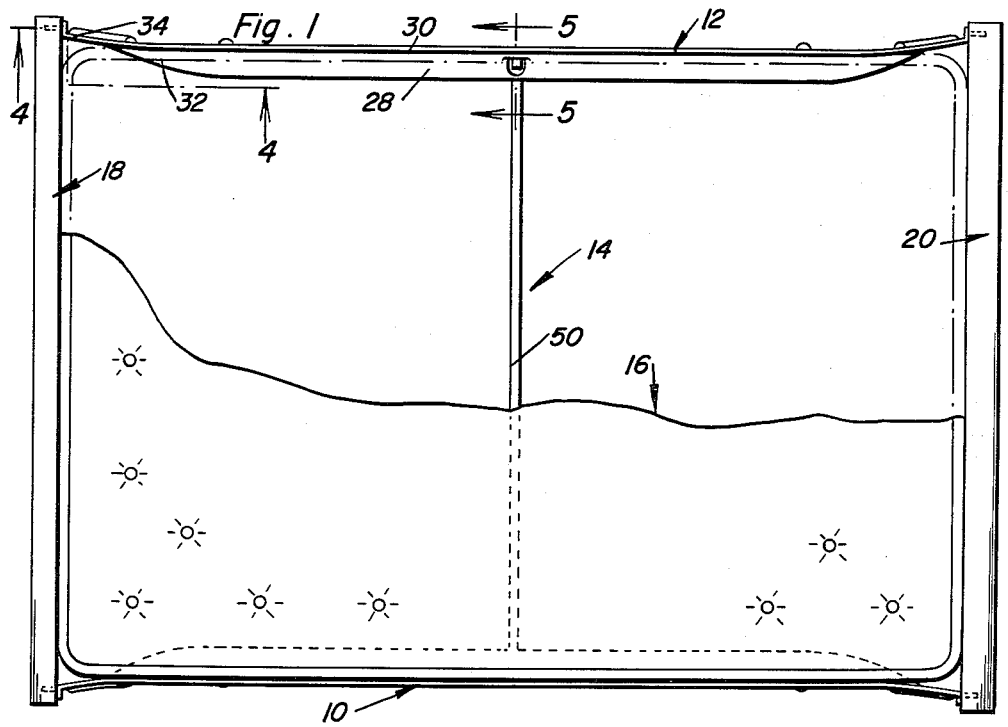
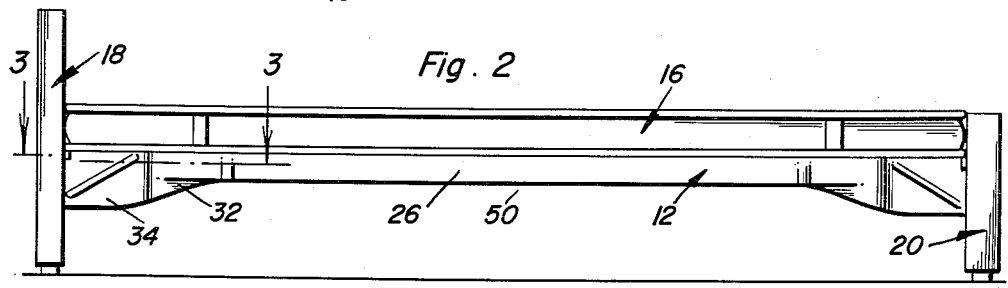
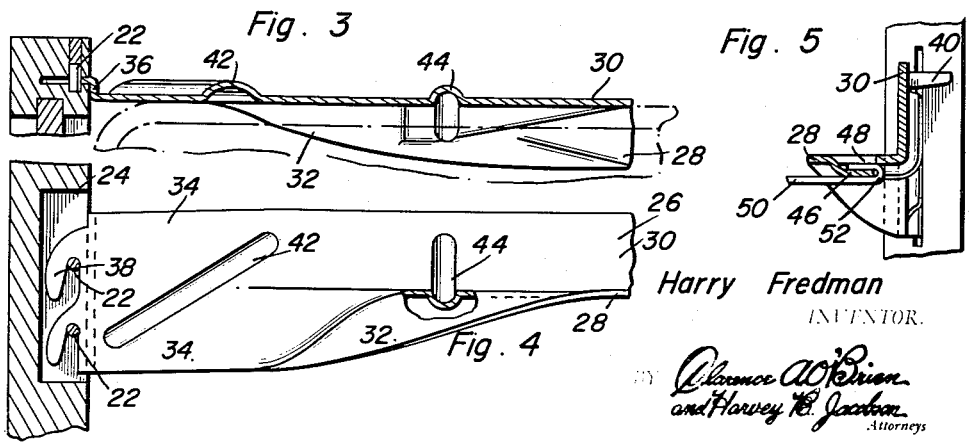
Harry Fredman
INVENTOR.

United States Patent Office 3,118,151
Patented Jan. 21, 1964

3,118,151
ONE-PIECE BELT-TYPE BEDDING CARRIER
Harry Fredman, Peoria, Ill.
Filed Apr. 10, 1962, Ser. No. 186,400
5 Claims. (Cl. 5—238)

The present invention generally relates to a novel and improved bed construction and more particularly to provide an arrangement in which the side rails or bed rails are constructed of one-piece metallic construction together with an interconnecting belt or strap between the bed rails which securely locks the bedding such as the spring frame to the bed rails thereby providing a unit in which the spring frame becomes an integral part of the assembly for not only securely retaining the spring frame on the bed rails but also employing the rigidity of the spring frame to rigidify the bed and provide a single integral and interlocked assembly.

Therefore, this unified construction gives the user the benefit of being able to move the bed because of the firmness and when the bed is moved it takes away the danger of damage because any other construction of bed with slatless rail does not give it the rigidity and does not render the bed legs firmer so the housewife can move it for the purpose of cleaning. All other types of beds set up with rails do not interlock the bed legs to keep them from spreading and therefore breaking away the glued joints which allows the bedding to fall to the floor. This new rail locks in the bed to the rails and eliminates the danger of breaking when moving for cleaning which is so important because bed and bedding become a one-piece unit like a rigid door jamb.

One of the most significant problems confronting bed manufacturers and users has been the use of slats extending between and supported on ledges on the bed rails. Normally, three slats are used and due to outward deflection of the central portions of the bed rails and downward deflection of the central portion of the slats, the slats quite often will drop off of the ledges thus no longer supporting the spring frame whether it be an inner spring assembly or a steel spring frame. This is especially a problem when a person sits on the edge of a bed which tends to move all of the slats toward one bed rail and also outwardly deflects the bed rail so that the slats may drop through. Various endeavors have been made to overcome this problem but such endeavors have been somewhat unsuccessful due to the necessity of providing for varying distances between the supporting pins for the bed rails on the headboard and footboard. While the width of spring assemblies has been standardized, the distance between the supporting pins for the bed rails on the headboards and footboards will vary considerably from this standard distance thereby requiring a rather complex manner of attaching bed rails to the headboard and footboard in order that the bed rail may conform to the width of the spring frame when no slats are being used.

The above refers to a bed rail which is now commercially available and called slatless bed rail. The bed rail so called slatless which is moved by notches to reduce the width of the bed is not sufficient to enclose the bedding to protect it from falling through because it has only a 1¼" ledge and has no strap protection. Therefore, at no time do they close into the bedding enough and when pressure it applied to center of bedding, whether steel springs or innersprings, the center of the spring gives and so will the bed rail give and in many cases the bed legs spread away and allow the bedding to fall through. Therefore, today there is no rail that is successfully used without slats that gives full benefits to the user and at no time does it give bedding into a frame firmly to protect the bedding from falling. This new onepiece bed rails as described further herein, which the ends of the one-piece rail closes in the bed legs and holds them rigidly to the inside position and then there is no danger of the glued joints breaking and spreading because the strap tie center makes it a rigid unit and easy moving as well and never loses bedding.

In order to overcome the problems existent in this type of bed construction, it is a primary object of the present invention to provide a one-piece bed rail of metallic construction having end portions constructed with sufficient resiliency to enable the end portions to be laterally flexed for engagement with the pins on the headboard or footboard which may be spaced apart a lesser or greater distance than the width of the spring assembly which supports the mattress together with a tension belt or strap interconnecting the central portions of the bed rails for retaining the central portion and the major portion of the length of the bed rails in a position for snugly embracing the bottom side corners of the spring frame whether it be an inner spring assembly or a steel spring assembly.

By providing the interconnecting belt or strap, the portion of the side rail of angular construction will be retained at a distance that is standard for the spring assembly. Adjacent each end of the bed rail, the bottom flange is flared downwardly into a vertical plate-like end portion having hooks and lateral flanges on the terminal end portions thereof. The bed rails are constructed of spring steel of a gauge capable of supporting the bedding and persons resting thereon when formed into angular configuration but being capable of resiliently flexing laterally at the plate-like end portions for enabling the hooks to be engaged with pins on a headboard and footboard even though the pins may be spaced apart a distance greater than the normal width of a spring assembly or spaced apart a distance less than the normal width of a spring assembly.

Another important object of the present invention is to provide a one-piece bed rail construction together with interconnecting strap means or belt means which provide an extremely simple construction but yet one which is highly successful for accomplishing its functions, easy to install, dependable and rugged in construction, eliminates the use and inconveniences of slats and generally inexpensive to manufacture.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a top plan view of a bed with the bed rails and interconnecting belt incorporated therein and illustrating the relationship to the spring assembly;

FIGURE 2 is a side elevational view of the construction of FIGURE 1;

FIGURE 3 is a detailed plan sectional view taken substantially upon a plane passing along section line 3—3 of FIGURE 2;

FIGURE 4 is a detailed sectional view taken substantially upon a plane passing along section line 4—4 of FIGURE 1; and FIGURE 5 is a detailed sectional view taken substantially upon a plane passing along section line 5—5 of FIGURE 1 illustrating the manner in which the strap is attached to the side rails.

Referring now specifically to the drawings, the numeral 10 generally designates a bed assembly employing the carrier of the present invention which includes a pair of side rails or bed rails each generally designated by the numeral 12 interconnected by a belt or strap generally designated by the numeral 14 for supporting a spring assembly generally designated by the numeral 16 which may be the inner spring type or the steel spring type. A headboard generally designated by numeral 18 is provided together with a footboard generally designated by the numeral 20. The exact details of construction of the footboard and headboard may vary as may the spring assembly 16. All spring assemblies are constructed with a standard width which is rigidly maintained in the bedding industry. However, headboards and footboards are constructed with the supporting pins 22 and recesses or sockets 24 providing access thereto being spaced at varying distances apart either left or greater than the width of the spring assemblies 16. Insofar as the present invention is concerned, the headboard and footboard and the spring assemblies are of conventional construction and the present invention requires no modification thereof whatsoever.

Each bedrail 12 includes an elongated metal rail 26 having a horizontally disposed flange 28 and a vertically disposed flange 30 throughout the major portion of the length thereof. Adjacent each end of the rail 26, the horizontal flange 28 is flared downwardly as indicated by reference numeral 32 into a generally vertical plate-like end portion 34, which may be more easily flexed laterally than the portion of the rail having an angular cross-sectional configuration.

The terminal end of the plate-like end portion 34 is provided with an offset flange 36 disposed perpendicularly to the plate-like end portion 34. A pair of downwardly opening hooks 38 are provided on the terminal edge of the flange 36 for insertion into the slot or socket 24 for engaging over the pins 22 in a conventional manner. At the top edge of the flange 36, there is provided a laterally extending lug or finger 40 for engaging the front surface of the headboard in parallel relation to the flange 36. The flange 36 engages the headboard 18 on one side of the slot 24 while the finger or lug 40 engages the headboard on the opposite side thereof thus maintaining the bedrail generally in perpendicular relation to the headboard or footboard in a conventional manner.

To reinforce the plate-like end portion to generally prevent it from deforming into angular cross-sectional configuration, there is provided a diagonal reinforcement embossment 42 which has a concave inner surface and a convex outer surface. Also, the end portion of the horizontal flange 28 is reinforced by a reinforcing embossment 44 in the form of a concave inner surface and a convex outer surface extending along the horizontal flange 28 and vertical flange 30 as illustrated in FIGURES 3 and 4.

At the center of each of the bedrails 26, the horizontal flange 28 thereof is provided with a downwardly struck lug 46 which leaves an opening 48 in the horizontal flange. The lug 46 has the edge thereof nearest the vertical flange 30 severed from the horizontal flange 28 while the edge thereof nearest the free edge of the horizontal flange 28 remains integral with the flange 28 and is downwardly offset therefrom thus forming a hook-like member which opens toward the outside of the bed for receiving the end of the strap.

The strap 14 is in the form of an elongated belt or strap 50 constructed of metal having a sufficient tensile strength to withstand any forces normally encountered. The ends of the strap 50 are reversely bent to form hooks 52 for interlocking engagement with the downwardly struck lugs 46 on the horizontal flanges 28 of the side rails 26. Thus, by providing the strap 50 of a predetermined length, the spatial relationship between the bed rails 12 may be accurately determined. Inasmuch as the portion of the bed rails 26 which are of right angular cross-sectional configuration will not flex, the single centrally located strap 50 will retain the major portion of the bed rails in parallel relation and in substantially gripping relation to the spring assembly 12.

As illustrated in FIGURE 1, the plate-like end portion 34 may be deflected laterally by exerting lateral pressure thereon so that the bed rails may be used with headboards 18 having the pins 22 and the access slot 24 spaced apart a greater distance than the width of the spring assembly. Normally, the spring assembly is 52½ inches wide and the end portions of the bed rails may be deflected as much as one inch thus accommodating headboards having variations of two inches more than or less than the standard width of the spring assemblies.

As, with the present invention, the spring assembly actually becomes an integral part of the bed and will preclude a substantail canting of the side rails in relation to the headboard and footboard since the clamping relationship between the side rails and the spring assembly will retain the side rails in parallelism with each other. The strap may be easily assembled with the side rails by virtue of the side rails being deflected inwardly slightly for hooking the ends of the strap thereon or the device may be pivoted somewhat in the nature of a pivotal parallelogram in order to more easily orientate the strap in position and once the strap has been engaged with the lugs, the assembly may be orientated with the headboard and footboard perpendicular with the side rails which condition will be maintained since the spring assembly will completely fill the space between the vertical flanges of the side rails.

The tension strap 50 will absolutely preclude any outward lateral deflection of the bed rail thereby assuring that the horizontal flanges 28 thereof will constantly support the spring assembly throughout the length thereof with the flanges 28 forming an even support for the spring assemblies thereby overcoming another objection to the slats which, after a considerable period of use, will introduce unevenness into the spring assembly by causing the spring frame to bend where it passes over the slats inasmuch as the slats only support the edges of the spring frame at 3 longitudinally spaced points. Thus, a more positive and rigid support for the bed frame assembly is provided and there is no relative shifting between the spring assembly and the bed.

It is pointed out that the engagement of the rails 12 with the pins 22 in the headboard 18 and footboard 20 serve to actually pull inwardly on the supporting legs of the bed thus rigidly clamping the legs inwardly and forming a rigid unit which will eliminate the destruction of the glue joint between the legs and the footboard and headboard which occurs quite frequently when the bed is moved about by a housewife during normal cleaning procedures.

Further, with the vertical flanges of the side rails being disposed against the bedding, there is no space between the bedding and the side rails in which articles may become lost or deposited and this also eliminates a spot in which dust normally accumulates thereby eliminating an unsanitary condition that normally occurs in most beds.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A one piece bed rail comprising an elongated rail of right angular cross-sectional configuration over a major portion of its length and having a horizontal and vertical flange, the end portions of said rail being in the form of vertical plates having a laterally offset flange and downwardly opening hooks for engaging an end board of a bed, the horizontal flange flaring downwardly at the ends thereof into the vertical plates thereby enabling deflection of the ends of the rail while maintaining the major portion of the rail in constant relationship to another rail.

2. The structure as defined in claim 1 wherein the central part of said rail is provided with a downwardly offset lug means thereon for receiving the end portion of a tension member adapted to extend between adjacent side rails.

3. A bed assembly comprising a pair of side rails, a pair of end boards interconnecting and extending perpendicularly to said rails, a spring assembly supported on and between said rails and between said end boards, each of said rails being of one-piece metallic construction and having a right angular cross-sectional configuration substantially over a major portion of its length and including a horizontal flange extending under the spring assembly, a tension member interconnecting the central portions of the rails thereby preventing outward deflection of the central portions of the rails and maintaining the horizontal flange thereof in underlying relation to the spring assembly thereby providing support therefor.

4. The structure as defined in claim 3 wherein each end portion of each rail is formed in the configuration of a vertical plate capable of being resiliently laterally deflected, hook members on the ends of each rail for engagement with the end boards, said plates enabling the end portions of the rails to be deflected laterally to engage with pins on the end boards spaced at varying distances apart for connecting the rails to the end boards while maintaining the central portions thereof in constant spatial relation, the spatial relation between the vertical flanges of the side rails being such that the spring assembly will be clamped therebetween whereby the spring assembly is locked to the rails to rigidify the entire assembly by retaining the vertical flanges snugly to the spring assembly throughout the major portion of the length of the rails.

5. The structure as defined in claim 4 wherein the central portion of the horizontal flange of each bed rail is provided with downwardly struck lug means formed therein, said tension member having inturned hook ends engaged with said lug means for retaining the rails in parallel relation throughout the major portion of the length thereof.

References Cited in the file of this patent

UNITED STATES PATENTS

| | | |
|---|---|---|
| 1,983,612 | Junkers | Dec. 11, 1934 |
| 2,771,616 | Duncan | Nov. 27, 1956 |
| 2,772,424 | Roche et al. | Dec. 4, 1956 |
| 2,845,636 | Iaquinta et al. | Aug. 5, 1958 |

FOREIGN PATENTS

| | | |
|---|---|---|
| 96,849 | Norway | Oct. 10, 1960 |